United States Patent
Fea et al.

(10) Patent No.: US 10,812,320 B2
(45) Date of Patent: Oct. 20, 2020

(54) FACILITATION OF DISASTER RECOVERY PROTECTION FOR A MASTER SOFTSWITCH

(71) Applicant: AT&T Intellectual Property I, L.P., Atlanta, GA (US)

(72) Inventors: Anthony Fea, Morganville, NJ (US); Brian Young, Covington, PA (US); Christian Wintonick, Colonia, NJ (US); Matthew Pandoliano, Vancouver, WA (US); Pamela Cullison, Greenwood, IN (US); Wayne Dodge, Easton, PA (US); Martin Ashley, West Orange, NJ (US); Dennis Reese, Eatontown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/289,997

(22) Filed: Mar. 1, 2019

(65) Prior Publication Data
US 2020/0280481 A1    Sep. 3, 2020

(51) Int. Cl.
  *G06F 11/00* (2006.01)
  *H04L 12/24* (2006.01)
  *H04L 29/08* (2006.01)
  *H04W 4/50* (2018.01)

(52) U.S. Cl.
  CPC ...... *H04L 41/0654* (2013.01); *H04L 67/1095* (2013.01); *H04W 4/50* (2018.02)

(58) Field of Classification Search
  CPC ... H04L 41/0654; H04L 67/1095; H04W 4/50
  USPC .............. 370/216, 217, 220, 221, 225
  See application file for complete search history.

(56) References Cited

U.S. PATENT DOCUMENTS

| | | | |
|---|---|---|---|
| 2011/0161297 A1* | 6/2011 | Parab ............... | G06F 11/1453 707/646 |
| 2011/0164508 A1* | 7/2011 | Arai ................. | H04L 45/00 370/245 |
| 2014/0068247 A1* | 3/2014 | Davis ............... | H04L 9/3228 713/155 |
| 2018/0150501 A1* | 5/2018 | Hattori ............. | G06F 16/275 |
| 2019/0095293 A1* | 3/2019 | Zhang .............. | G06F 11/0784 |
| 2019/0155705 A1* | 5/2019 | Chavan ............ | G06F 11/2094 |
| 2019/0327129 A1* | 10/2019 | Higuchi ............ | H04L 41/0672 |

* cited by examiner

*Primary Examiner* — Chuong T Ho
(74) *Attorney, Agent, or Firm* — Amin, Turocy & Watson, LLP

(57) ABSTRACT

A disaster recovery process and solution for a master routing server can utilize replicate servers to generate efficiencies when a failure occurs. A voice over Internet protocol (VoIP) platform can utilize the master routing server for customer call flow and feature provisioning. Back-up data can be stored at a cloud-based data store and sent to a replicate server that has been promoted in response to a failure being determined to have occurred. Additionally, the master routing server can receive and maintain a master provisioning database and send that database to the replicate routing servers for the purpose of properly routing call flows.

20 Claims, 10 Drawing Sheets

FACILITATION OF DISASTER RECOVERY PROTECTION FOR A MASTER SOFTSWITCH

TECHNICAL FIELD

This disclosure relates generally to facilitating evaluation of existing replicate policy servers to determine which replicate(s), based on database status compared to an original master database, would be the best candidate(s) to take over as a new master policy server. More specifically, this disclosure comprises a procedure to quickly promote the best candidate replicate policy server into the new master role and then migrate remaining replicate policy servers from the original master policy server to the new master policy sever.

BACKGROUND

In a large network, emergency cutovers to a new master policy server can be a highly manual and time-intensive effort. For example, all customer provisioning and network routing can originate from a provisioning operational support system and is destined to the master policy server. However, when the master policy server is unavailable, no customer builds or network routing changes can be made and the replicates cannot pull data from the master policy server.

The above-described background relating to a disaster recovery protection is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
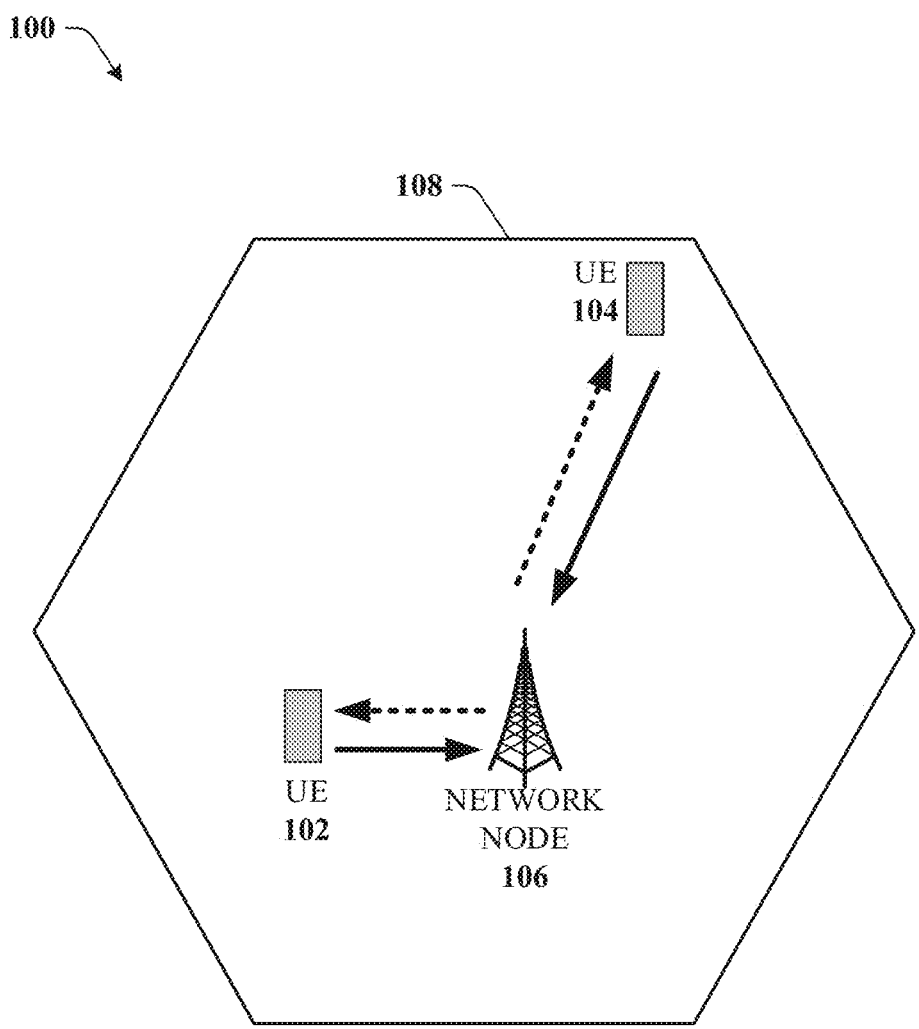
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate disaster recovery for a wireless network. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate disaster recovery for a wireless network. Facilitating disaster recovery for a wireless network can be implemented in connection with any type of device with a connection to the communications network such as: a mobile handset, a computer, a handheld device, or the like.

This disclosure comprises a disaster recovery process and solution for a master routing server in a master/replicate (a.k.a. slave), client/server, and/or parent/child relationship. A voice over Internet protocol (VoIP) platform can utilize a master routing server for customer call flow and feature provisioning. The master routing server can receive and maintain a master provisioning database and send data from that database to replicate routing servers for the purpose of properly routing call flows. Loss of the master softswitch can block provisioning and can place the master database and associated call routing control at risk.

However, even when equipment failures occur due to environmental factors such as hurricanes, wildfires, lightning strikes, flooding, man-made events, and/or anything that could endanger the master routing server, provisioning, and database, business continuity still needs to be maintained. The current process of arbitrarily selecting any replicate for conversion to the master role, then moving or migrating all remaining replicate VoIP soft switches, is not sufficient as a disaster recovery process because it does not identify which replicates have a database most synchronized with the master database (e.g., database with the highest structured queried language (SQL) number). Synchronization can be dependent on how closely a database of the replicate server mirrors (or is the most in sync with) the database of the master policy server. This method and procedure was developed to resolve downtime due to system failures. For example, if the master policy server database comprises elements ABCD and a first replicate serves only comprises elements AB and a second replicate server comprises elements ABC, then the second replicate server can be selected as the database that is more synchronized with the master policy server because its data is more in sync with the master policy server database. In other embodiments the replicate server can comprise identical elements to that of the master policy server database. in yet other embodiments, the system can canvas the replicate servers to determine which replicate server is or which replicate servers are more in sync with the master policy server via randomized, linear, or chronological manner. Additionally, APIs, GUIs, and/or command line interfaces (CUIs) can facilitate the data transfer between the provisional operational support system, users, EMS, and any master or slave server devices.

The idea or solution is to evaluate the status of database synchronization between the master and individual replicates for the purpose of identifying/labeling which replicate routing servers are candidates to take over the role of master in a disaster recovery and/or restoration scenario. This solution can utilize software scripting and tooling to automate the processes named in this disclosure. Additionally, part of this solution is the need for criteria to select the best candidate replicate to promote to master in a disaster recovery and restoration situation. In an alternative embodiment, the system can proactively switch to a different master based on one or more predefined factors. The process flow comprises determining a failure of a master policy server has occurred, identifying a replicate server based on its synchronization with the master server, promoting the replicate server as a new master server in response to the identifying, and then alerting other replicate servers of the new master server. The users can communicate with the master policy server via GUIs and CLIs of the EMS. The provisioning operational support system can communicate with the master policy server via the API.

When a master policy server device, also known as a server, becomes unavailable there is an intensive manual process to switch over to a standby policy server. The master policy server can interface with provisioning systems, can house a master database, replicated provisioning orders for downstream replicate servers, and can serve as a master for client server devices. The first step is to promote the standby policy server to the active master. Then the new master policy server can be communicated to other policy servers within the system so that they know which policy server is the new master. The communication/updating can take extensive time per policy server. In a large network, this makes emergency cutovers to a new master policy server a highly manual and time-intensive effort. For example, all customer provisioning and network routing can originate from a provisioning operational support system, for configuration management, and is destined to the master policy server through the EMS. When the master policy server is unavailable, no customer builds or network routing changes can be made and the replicates cannot pull data from the master policy server.

It should also be noted that an artificial intelligence (AI) component can facilitate automating one or more features in accordance with the disclosed aspects. A memory and a processor as well as other components can include functionality with regard to the figures. The disclosed aspects in connection with facilitation of disaster recovery protection can employ various AI-based schemes for carrying out various aspects thereof. For example, a process for detecting one or more trigger events, promoting a replicate as a result of the one or more trigger events, and modifying one or more statuses of a master policy server, and so forth, can be facilitated with an example automatic classifier system and process. In another example, a process for penalizing one master policy server and/or replicate while preferring another master policy server and/or replicate can be facilitated with the example automatic classifier system and process. An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a replicate status, modifying a master policy server status, and so forth. The criteria can include, but is not limited to, predefined values, frequency attenuation tables or other parameters, service provider preferences and/or policies, and so on.

In one embodiment, described herein is a method comprising receiving, by a wireless network device comprising a processor, an indication that a master server device has been determined to have failed. In response to the indication that the master server device has been determined to have failed, the method can comprise identifying, by the wireless network device, a server device based on synchronization data representative of a synchronization of data between the master server device and the server device. In response to the identifying the server device, the method can comprise designating, by the wireless network device, the server device as a new master server device for replacement of the master server device. Additionally, in response to the designating the server device as the new master server device, the method can comprise facilitating, by the wireless network device, uploading backup data to the new master server device from a data store, wherein the data store is a cloud-based data store. Furthermore, the method can comprise facilitating, by the wireless network device, transmitting the backup data to slave server devices via the new master server device.

According to another embodiment, a system can facilitate, provisioning a first master server device and a second master server device with a routing table to route network data. The system operations can comprise receiving an indication that the first master server device has been determined to have failed as a result of a hardware fault. In response to the receiving the indication, the system can operations can comprise identifying the second master server device as a potential second master server device based on synchronization data indicative of a synchronization status between the first master server device and the potential second master server device. Additionally, in response to the identifying, the system operations can comprise designating the potential second master server device as an active master server device. Furthermore, in response to the designating the second master device as the active master server device, the system operations can comprise updating slave devices to facilitate data transfers between the active master server device and the slave devices.

According to yet another embodiment, described herein is a machine-readable storage medium that can perform the operations comprising receiving an indication that a first master server device has been determined to have failed as a result of a power failure. The machine-readable storage medium can perform the operations comprising, in response to the receiving the indication and based on first master server device being determined to be in sync with a slave server device, assigning the slave server device, of slave service devices, as a second master server device to be used in lieu of the first master server device. In response to the assigning the slave server device as the second master server device, the machine-readable storage medium can perform the operations comprising facilitating uploading backup data to the second master server device from a data store, wherein the data store is a cloud-based data store and facilitating transmitting data to the slave server devices via the second master server device. Additionally, in response to the facilitating the uploading the backup data to the second master server device from the cloud-based data store, the machine-readable storage medium can perform the operations comprising alerting the slave server devices that the slave server device is the second master server device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
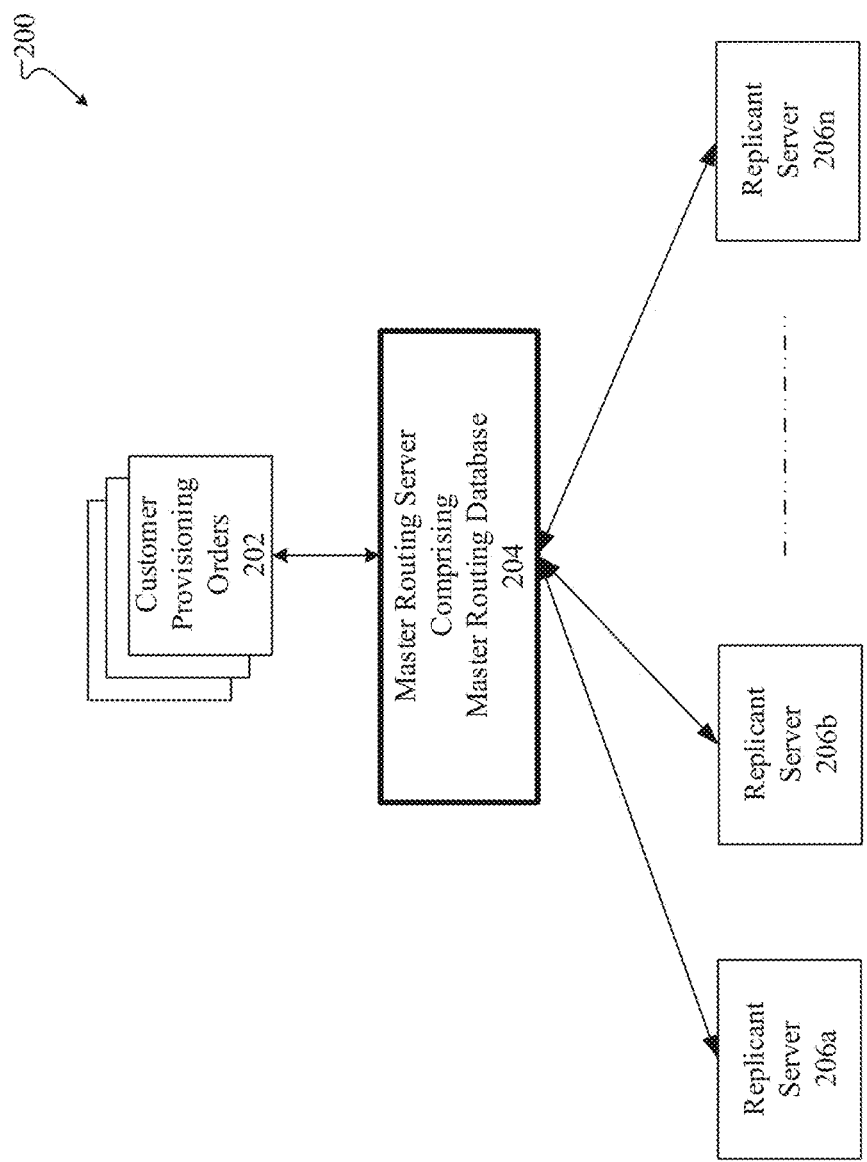
FIG. 2 illustrates an example master routing server and replicate architecture a according to one or more embodiments.

Referring now to FIG. 2, illustrated is an example master routing server and replicate architecture 200 a according to one or more embodiments. Within the master routing server and replicate architecture 200, customers can provision orders at block 202 that contain routing tables (e.g., IP addresses, call routing logic) that can comprise routing data. The routing data can tell a VoIP call to go from one phone to another. The master policy server 204 can also comprise a master routing database to facilitate the call routing. Additionally, replicate servers 206a, 206b, 206c can comprise replicated data that is based on the master routing database.

Figure 3:
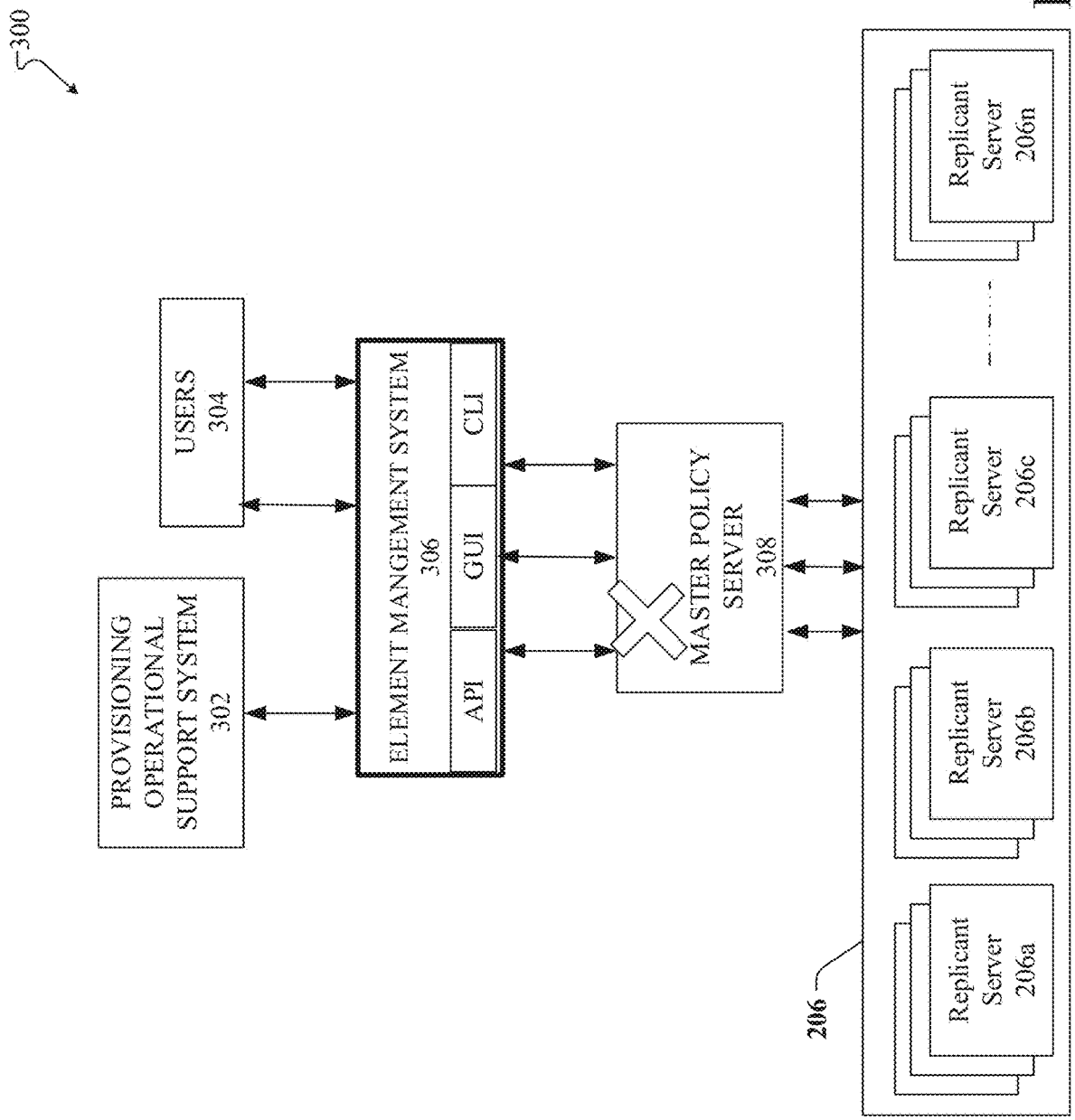
FIG. 3 illustrates an example master routing server and replicate architecture a according to one or more embodiments.

Referring now to FIG. 3, illustrated is an example master routing server and replicate architecture 300 according to one or more embodiments. A provisioning operational support system network element activation manager 302 can provision routing tables that contain routing data. The call routing logic can direct a VoIP call from users 304 of one mobile device to another mobile device, and send data to the EMS 306. The master policy server 308 can comprise a master database that can contain the data from the EMS 306. Call processing replicate data can be hosted at the replicate servers 206. For example, the master policy server 308 can synchronize its data with replicate servers 206. Thus, copies of the data from the master policy server 308 can be hosted at the replicate servers 206. However, it should be noted that updating each replicate server can be time consuming and/or randomized. Therefore, at any given moment, one replicate server can be synchronized (e.g., containing all or most of the data from the master policy server 308) with the master policy server 308 or unsynchronized based on differences between the current data in the replicate server and the new data at the master policy server 308.

Figure 4:
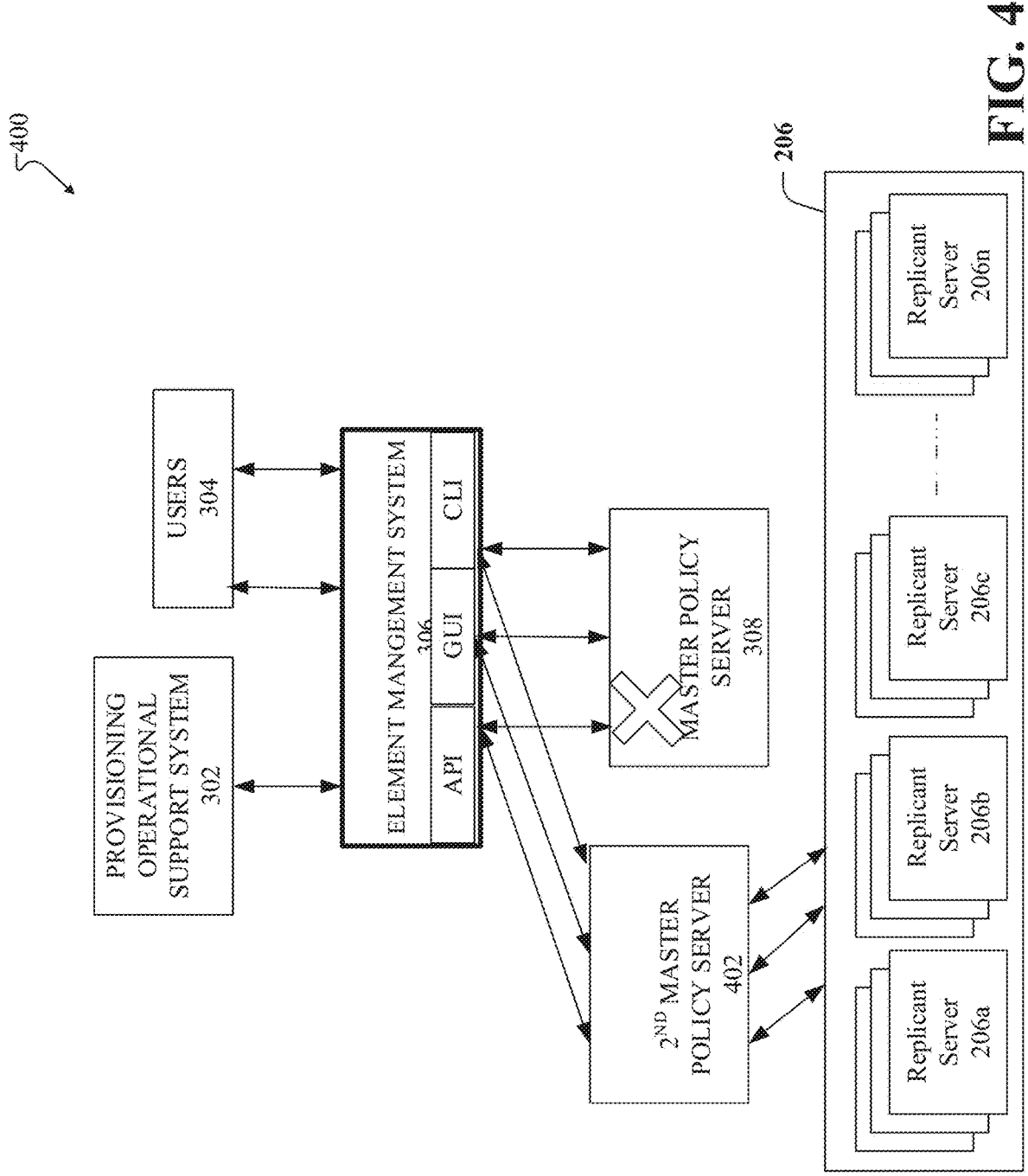
FIG. 4 illustrates an example master routing server and replicate architecture comprising a cloud-based data store a according to one or more embodiments.

Referring now to FIG. 4, illustrated is an example master routing server and replicate architecture 400 comprising a cloud-based data store 502 a according to one or more embodiments. Repetitive description of like elements employed in other embodiments described herein is omitted for sake of brevity. In an alternate embodiment, the master routing server and replicate architecture 400 can comprise a dual provisioning capability. The process for dual provisioning can comprise the provisioning operational support system provisioning at least two master policy servers 308, 402. The customer provisioning and network routing can originate from the provisioning operational support system and be destined to the master policy server 308 through the EMS 306. However, the first master policy server 308 can become isolated due to a hardware fault, a networking issue, a power issue, etc. in response to the first master policy server 308 failing, the replicate servers 206 (e.g., replicate policy servers) can be updated to reflect that the second master policy server 402 is the new master from which the replicate servers 206 shall replicate data.

Figure 5:
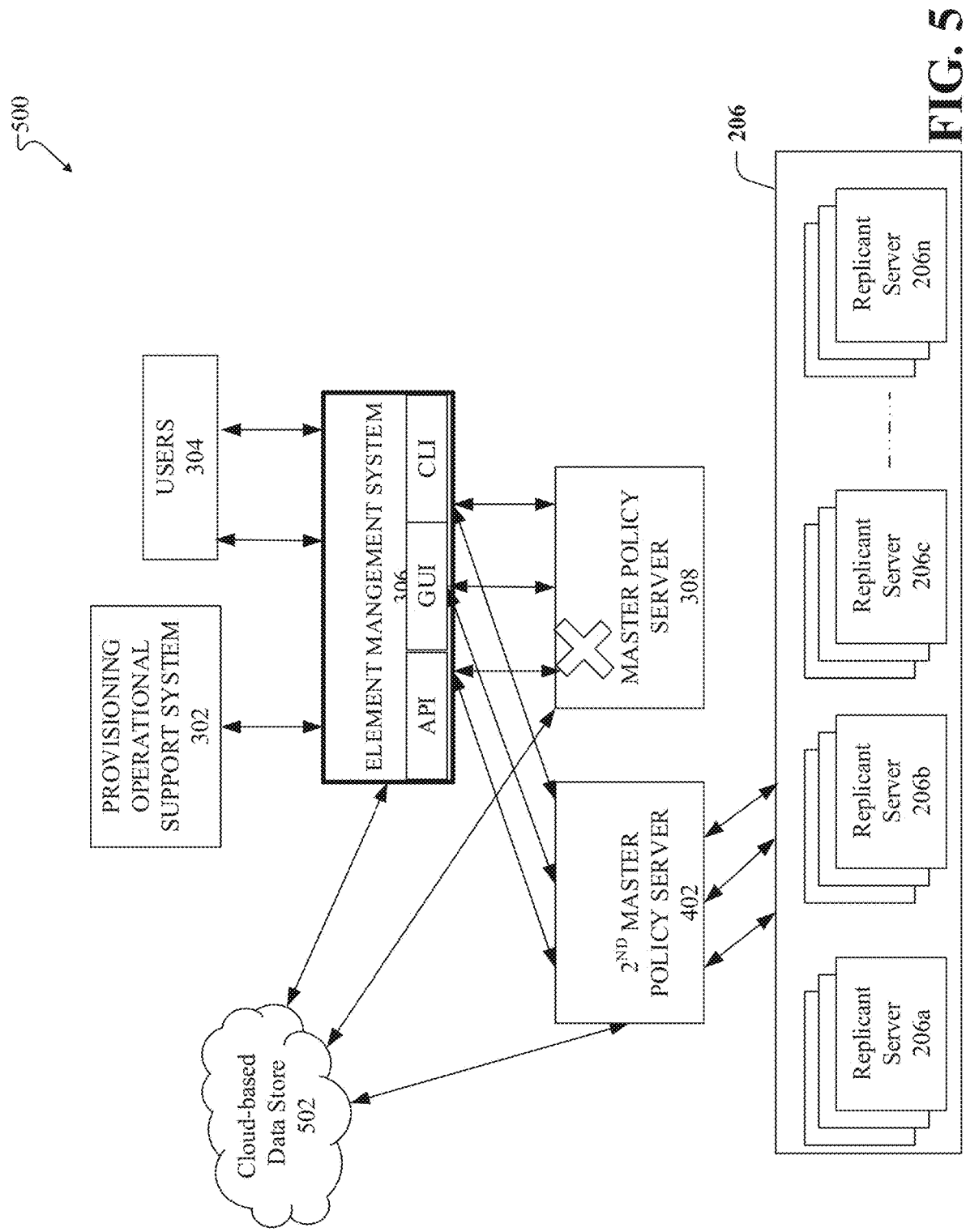
FIG. 5 illustrates an example master routing server and replicate architecture comprising dual provisioning option a according to one or more embodiments.

Referring now to FIG. 5, illustrated is an example master routing server and replicate architecture 500 comprising dual provisioning option a according to one or more embodiments. Repetitive description of like elements employed in other embodiments described herein is omitted for sake of brevity.

The master routing server and replicate architecture 500 can comprise a cloud-based database. As depicted in FIG. 5, if the master policy server 308 becomes isolated due to a hardware fault, a networking issue, a power issue, etc., then the master routing server and replicate architecture 500 can designate a policy server to become a new master policy server 402. In response to the new master policy server 402 being designated as the new master policy server 402, the latest back-up from the cloud-based database 502 can be uploaded to the new master policy server 402. After the cloud-based database 502 is uploaded to the new master policy server 402, the replicate servers (e.g., replicate policy servers) can be updated to reflect that the new master policy server 402 is the new master. Additionally, in response to the replicate servers (e.g., replicate policy servers) being updated to reflect that the new master policy server 402 is the new master, the provisioning operational support system 302 can be updated to provision the new master policy server 402. It should be noted that the various aforementioned embodiments can be combined. For example, the dual provisioning capability, as depicted in FIG. 4, can be combined with the cloud-based capability, as depicted in FIG. 5. It should be noted that the cloud-based database 502 can be updated via the EMS 306 and/or the master policy server 308.

Figure 6:
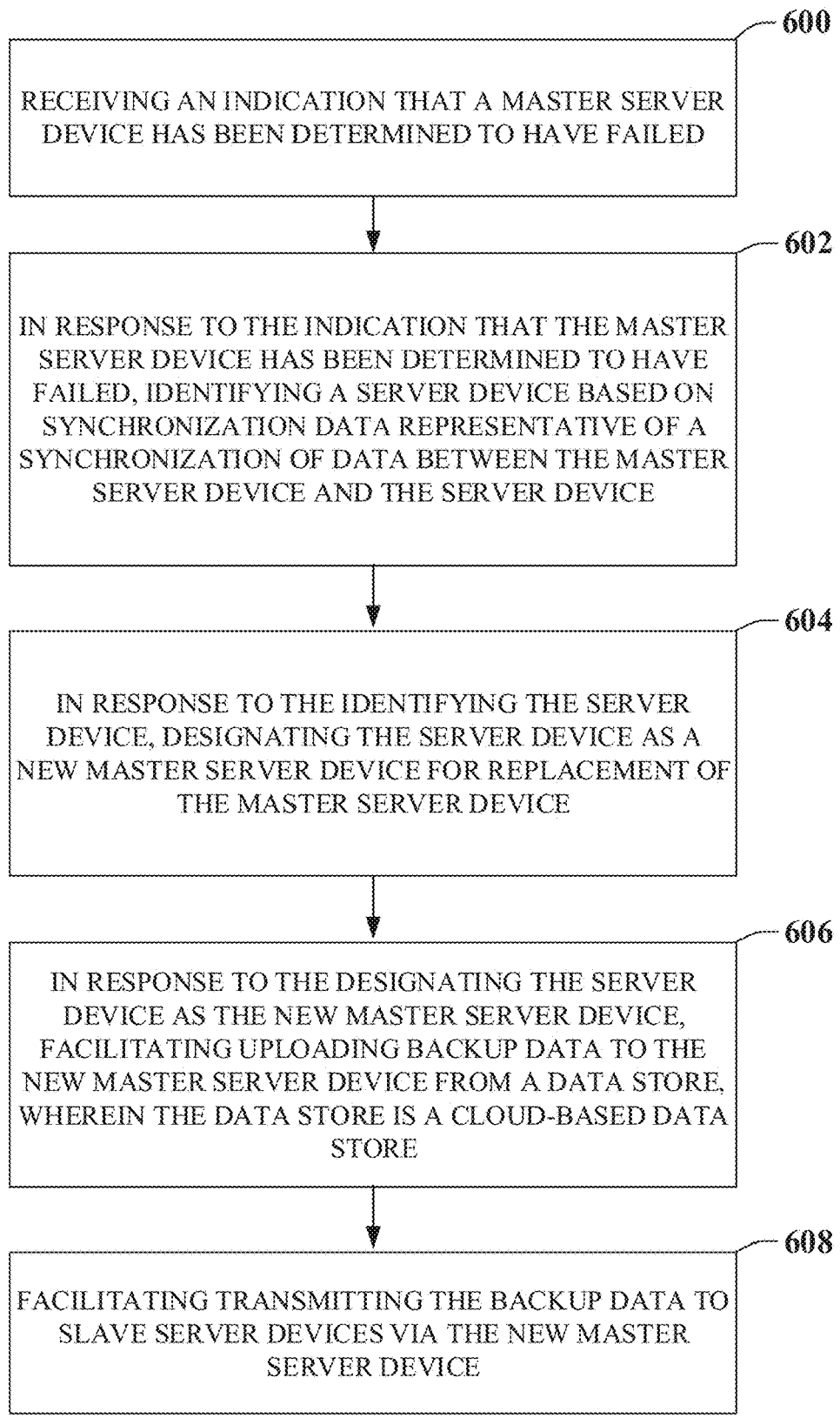
FIG. 6 illustrates an example flow diagram for a method for disaster recover for a wireless network according to one or more embodiments.

Referring now to FIG. 6, illustrated is an example flow diagram for a method for disaster recover for a wireless network according to one or more embodiments. At element 600, the method can comprise receiving (e.g., via the EMS 306) an indication that a master server device (e.g., master policy server 204) has been determined to have failed. In response to the indication that the master server device (e.g., master policy server 204) has been determined to have failed, at element 602, the method can comprise identifying (e.g., via the EMS 306) a server device based on synchronization data representative of a synchronization of data between the master server device (e.g., master policy server 204) and the server device. At element 604, in response to the identifying the server device, the method can comprise designating (e.g., via the EMS 306) the server device as a new master server device (e.g., $2^{nd}$ master policy server 402) for replacement of the master server device (e.g., master policy server 204). Additionally, in response to the designating the server device as the new master server device (e.g., $2^{nd}$ master policy server 402), at element 606, the method can comprise facilitating uploading backup data to the new master server device (e.g., $2^{nd}$ master policy server 402) from a data store, wherein the data store is a cloud-based data store 502. Furthermore, the method can comprise facilitating transmitting the backup data to slave server devices (e.g., replicate servers 206) via the new master server device (e.g., $2^{nd}$ master policy server 402) at element 608.

Figure 7:
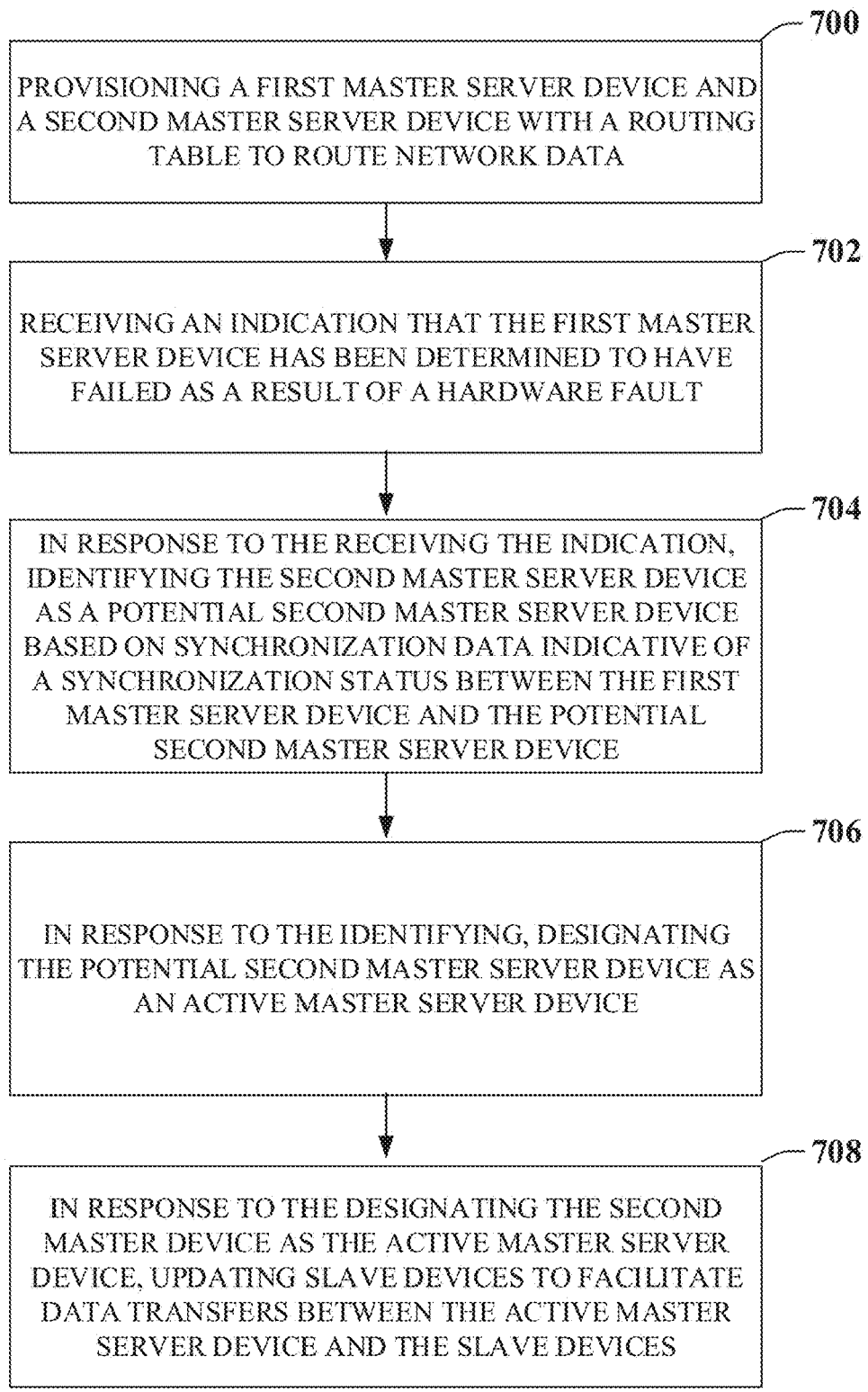
FIG. 7 illustrates an example flow diagram for a system for disaster recover for a wireless network according to one or more embodiments.

Referring now to FIG. 7, illustrated is an example flow diagram for a system for disaster recover for a wireless network according to one or more embodiments. At element 700, a system can facilitate, provisioning a first master server device (e.g., master policy server 204) and a second master server device (e.g., $2^{nd}$ master policy server 402) with a routing table to route network data. At element 702, the system operations can comprise receiving an indication that the first master server device (e.g., master policy server 204) has been determined to have failed as a result of a hardware fault. At element 704, in response to the receiving the indication, the system can operations can comprise identifying the second master server device (e.g., $2^{nd}$ master policy server 402) as a potential second master server device based on synchronization data indicative of a synchronization status between the first master server (e.g., master policy server 204) device and the potential second master server device. Additionally, in response to the identifying, at element 706, the system operations can comprise designating the potential second master server device as an active master server device. Furthermore, in response to the designating the second master device (e.g., $2^{nd}$ master policy server 402) as the active master server device (e.g., $2^{nd}$ master policy server 402), the system operations can comprise updating slave devices (e.g., replicate servers 206) to facilitate data transfers between the active master server device (e.g., $2^{nd}$ master policy server 402) and the slave devices (e.g., replicate servers 206) at element 708.

Figure 8:
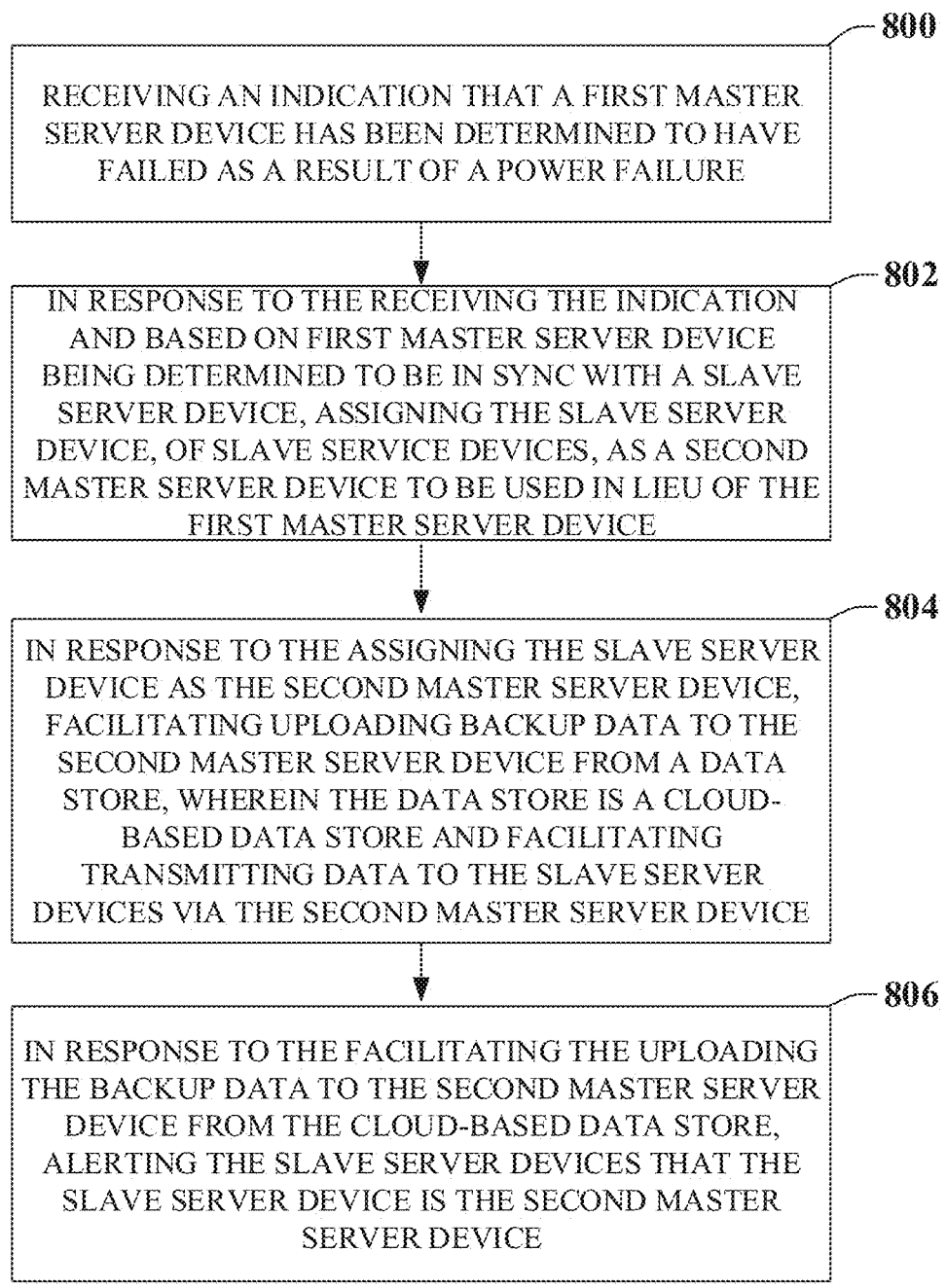
FIG. 8 illustrates an example flow diagram for a machine-readable medium for disaster recover for a wireless network according to one or more embodiments.

Referring now to FIG. 8, illustrated is an example flow diagram for a machine-readable medium for disaster recover for a wireless network according to one or more embodiments. At element 800, the machine-readable storage medium that can perform the operations comprising receiving an indication that a first master server device (e.g., master policy server 204) has been determined to have failed as a result of a power failure. At element 802, the machine-readable storage medium can perform the operations comprising, in response to the receiving the indication and based on first master server device (e.g., master policy server 204) being determined to be in sync with a slave server device, assigning the slave server device, of slave service devices (e.g., replicate servers 206), as a second master server device (e.g., $2^{nd}$ master policy server 402) to be used in lieu of the first master server device (e.g., master policy server 204). In response to the assigning the slave server device as the second master server device (e.g., $2^{nd}$ master policy server 402), at element 804, the machine-readable storage medium can perform the operations comprising facilitating uploading backup data to the second master server device (e.g., $2^{nd}$ master policy server 402) from a data store, wherein the data store is a cloud-based data store 502 and facilitating transmitting data to the slave server devices (e.g., replicate servers 206) via the second master server device (e.g., $2^{nd}$ master policy server 402). Additionally, in response to the facilitating the uploading the backup data to the second master server device (e.g., $2^{nd}$ master policy server 402) from the cloud-based data store 502, the machine-readable storage medium can perform the operations comprising alerting the slave server devices (e.g., replicate servers 206) that the slave server device is the second master server device (e.g., $2^{nd}$ master policy server 402) at element 806.

Figure 9:
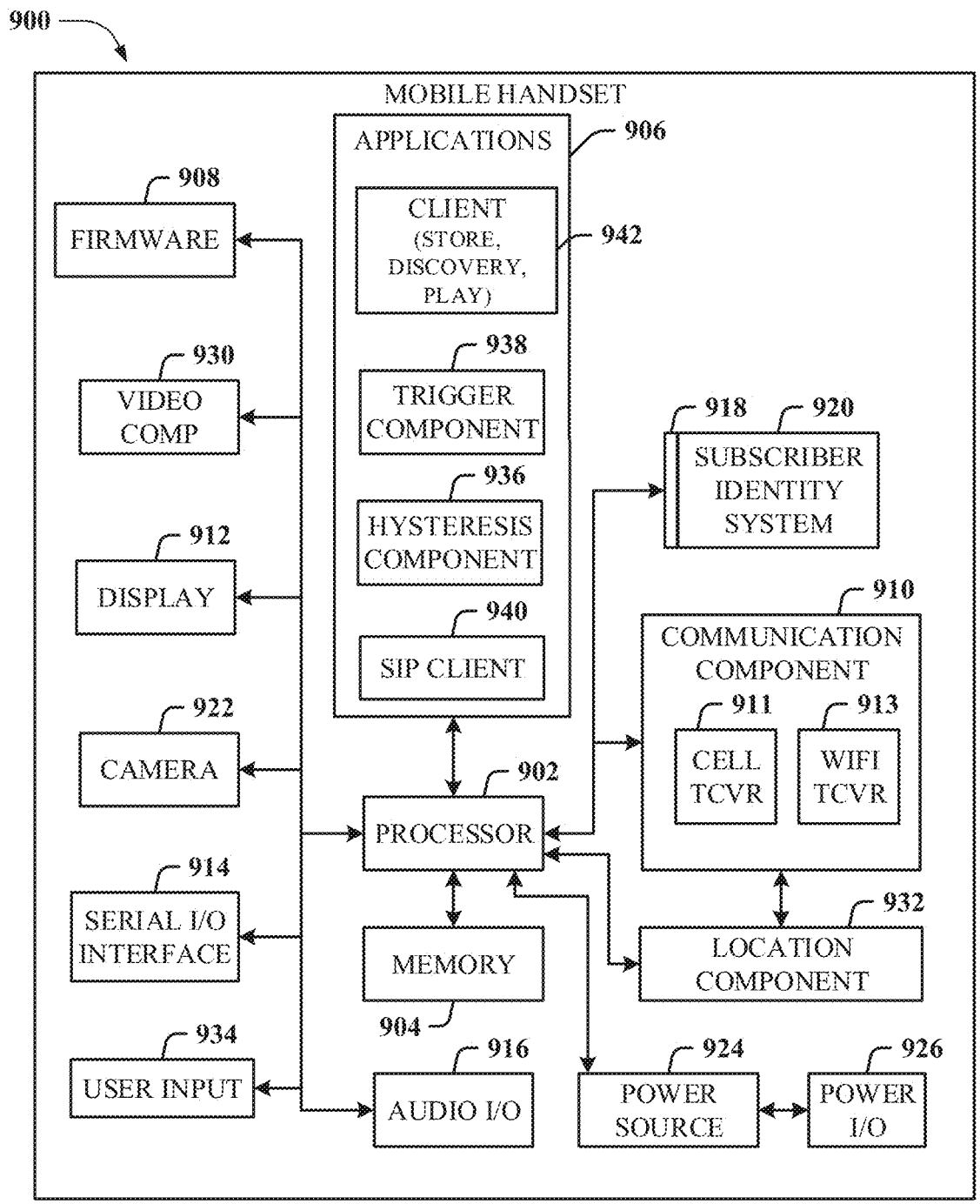
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
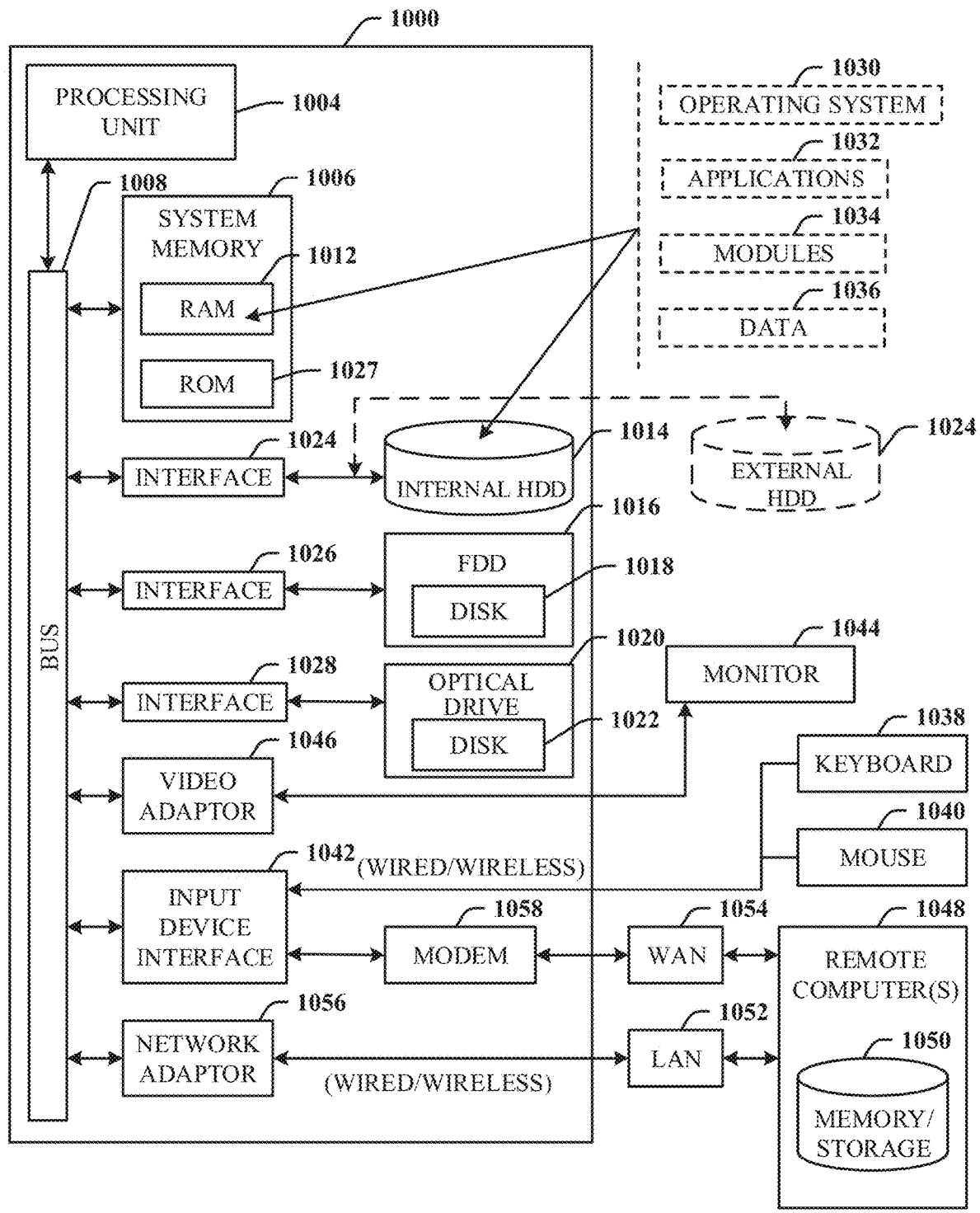
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054.

Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor, an indication that a master server device has been determined to have failed;
   in response to the indication that the master server device has been determined to have failed, identifying, by the network equipment, a first server device based on synchronization data representative of a synchronization of data between the master server device and the first server device;
   labeling, by the network equipment, the first server device as a first candidate server device to become a new master service device, wherein the labeling is further based on a priority of the first server device as compared to other server devices;
   in response to identifying the first server device, designating, by the network equipment, the first server device as a new master server device for replacement of the master server device;
   in response to designating the first server device as the new master server device, facilitating, by the network equipment, uploading backup data to the new master server device from a data store, wherein the data store is a cloud-based data store,
   facilitating, by the network equipment, transmitting the backup data to slave server devices via the new master server device;
   based on a second synchronization status associated with the new master server device and a second server device, labeling, by the network equipment, the second server device as a second candidate server device; and
   in response to labeling the second server device as the second candidate server device and in response to a power lapse of the new master server device, labeling, by the network equipment, the second candidate server device as an active master server device.

2. The method of claim 1, wherein the indication comprises an indication of a hardware fault associated with the master server device.

3. The method of claim 2, wherein the backup data is a most recent backup data stored within the data store.

4. The method of claim 1, wherein the indication comprises an indication of a networking fault associated with the master server device.

5. The method of claim 1, wherein the indication comprises an indication of a power outage associated with the master server device.

6. The method of claim 1, further comprising:
   in response to designating the first server device as the new master server device, informing, by the network equipment, the slave server devices that the master server device has been replaced with the new master server device.

7. The method of claim 1, further comprising:
   in response to the facilitating of the uploading of the backup data to the new master server device, prompting, by the network equipment, a servicing provisioning platform to provision the new master server device.

8. A system, comprising:
   a processor; and
   a memory that stores executable instructions that, when executed by the processor, facilitate performance of operations, comprising:
   provisioning a first master server device and a second master server device with a routing table to route network data;

receiving an indication that the first master server device has been determined to have failed as a result of a hardware fault;

labeling the first master server device as a first candidate server device to become a new master service device, wherein the labeling is further based on a priority of the first master server device as compared to other server devices other than the first master server device;

in response to the receiving, identifying the second master server device as a potential second master server device based on synchronization data indicative of a synchronization status between the first master server device and the potential second master server device;

in response to a power lapse of the new master server device and based on a second synchronization status associated with the new master server device and the second master server device, designating the potential second master server device as an active master server device; and in response to designating the second master device as the active master server device and in response to the first master server device being determined to have failed, updating slave devices to facilitate data transfers between the active master server device and the slave devices.

9. The system of claim 8, wherein the operations further comprise:

uploading backup data to the second master server device from a cloud-based data store.

10. The system of claim 9, wherein the data transfers comprise the backup data from the cloud-based data store.

11. The system of claim 8, wherein the provisioning is facilitated via an element management system.

12. The system of claim 11, wherein the active master server device communicates with the element management system via an application program interface.

13. The system of claim 11, wherein the active master server device communicates with the element management system via a graphical user interface.

14. The system of claim 11, wherein the active master server communicates with the element management system via a command line interface.

15. A non-transitory machine-readable medium, comprising executable instructions that, when executed by a processor, facilitate performance of operations, comprising:

receiving an indication that a first master server device has been determined to have failed as a result of a power failure;

in response to receiving the indication and based on the first master server device being determined to be in sync with a slave server device, assigning the slave server device, of slave service devices, as a second master server device to be used in lieu of the first master server device;

in response to assigning the slave server device as the second master server device, facilitating uploading backup data to the second master server device from a data store, wherein the data store is a cloud-based data store and facilitating transmitting data to the slave server devices via the second master server device;

in response to facilitating the uploading of the backup data to the second master server device from the cloud-based data store, alerting the slave server devices that the slave server device is the second master server device;

based on a first synchronization status of the slave server device and the first master server device, labeling the slave server device as a first candidate to become the second master service device, wherein the labeling is further based on a priority of the slave server device as compared to other ones of the slave server devices;

based on a second synchronization status associated with the second master server device and a second slave server device of the slave server devices, labeling the second slave server device as a second candidate server device; and in response to labeling the second slave server device as the second candidate server device and in response to a power lapse of the second master server device, labeling the second candidate server device as an active master server device.

16. The non-transitory machine-readable medium of claim 15, wherein the indication comprises an indication that the first master server device has failed as a result of a networking error.

17. The non-transitory machine-readable medium of claim 15, wherein the power failure is a result of a hardware failure.

18. The non-transitory machine-readable medium of claim 15, wherein the indication comprises the indication of a networking fault associated with the first master server device.

19. The non-transitory machine-readable medium of claim 15, wherein the operations further comprise:

in response to the labeling, generating back-up data to be stored within the cloud-based data store.

20. The non-transitory machine-readable medium of claim 19, wherein the operations further comprise:

informing the slave server devices that the second candidate server device has been labeled as the active master server device.

* * * * *